Dec. 15, 1931.  B. O. WESTERFIELD  1,836,349
CANDY FORMING MACHINE
Filed Nov. 22, 1928  6 Sheets-Sheet 1
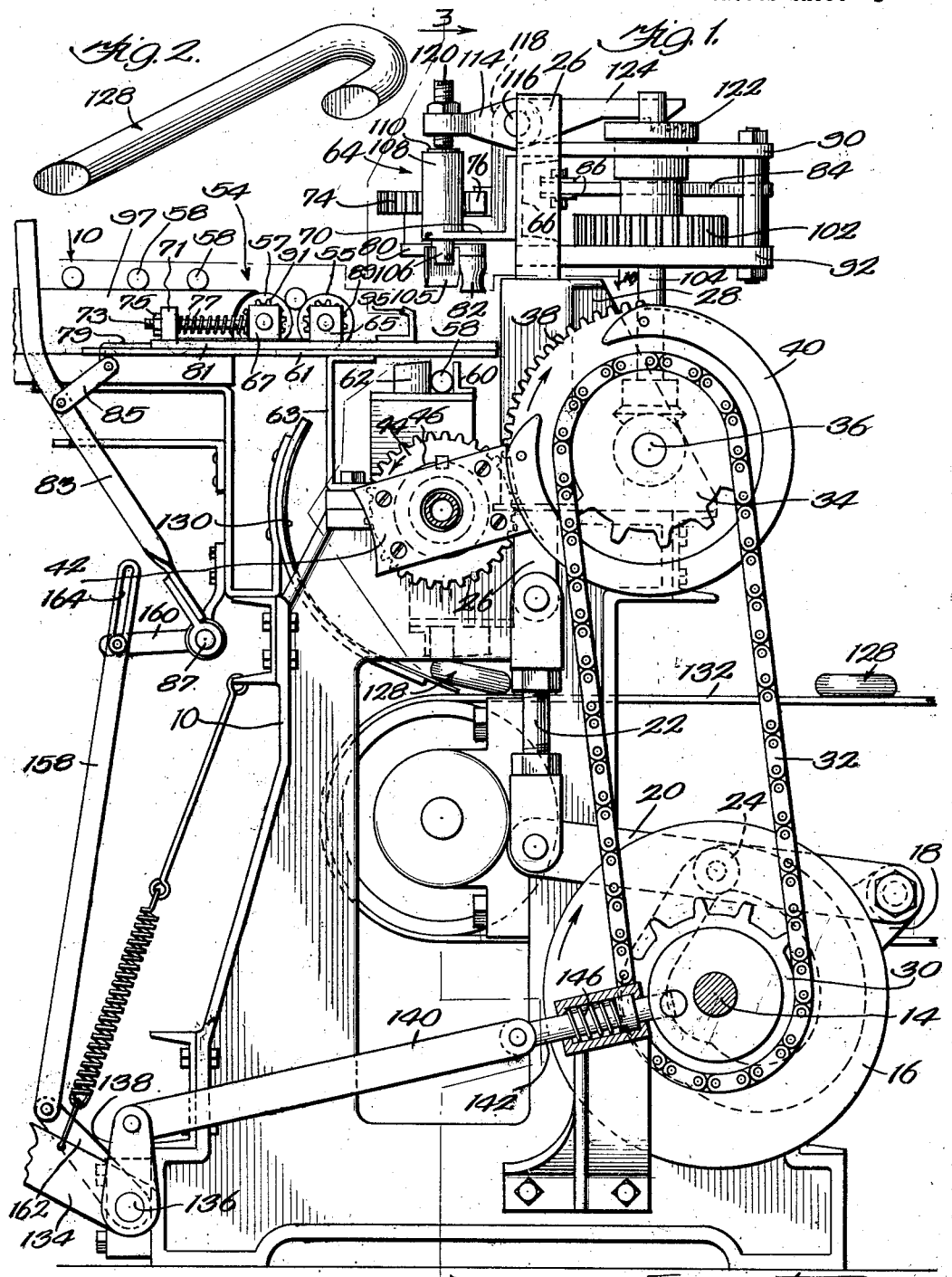
Inventor
BRASHER O. WESTERFIELD
By Cheever & Cox Attys.

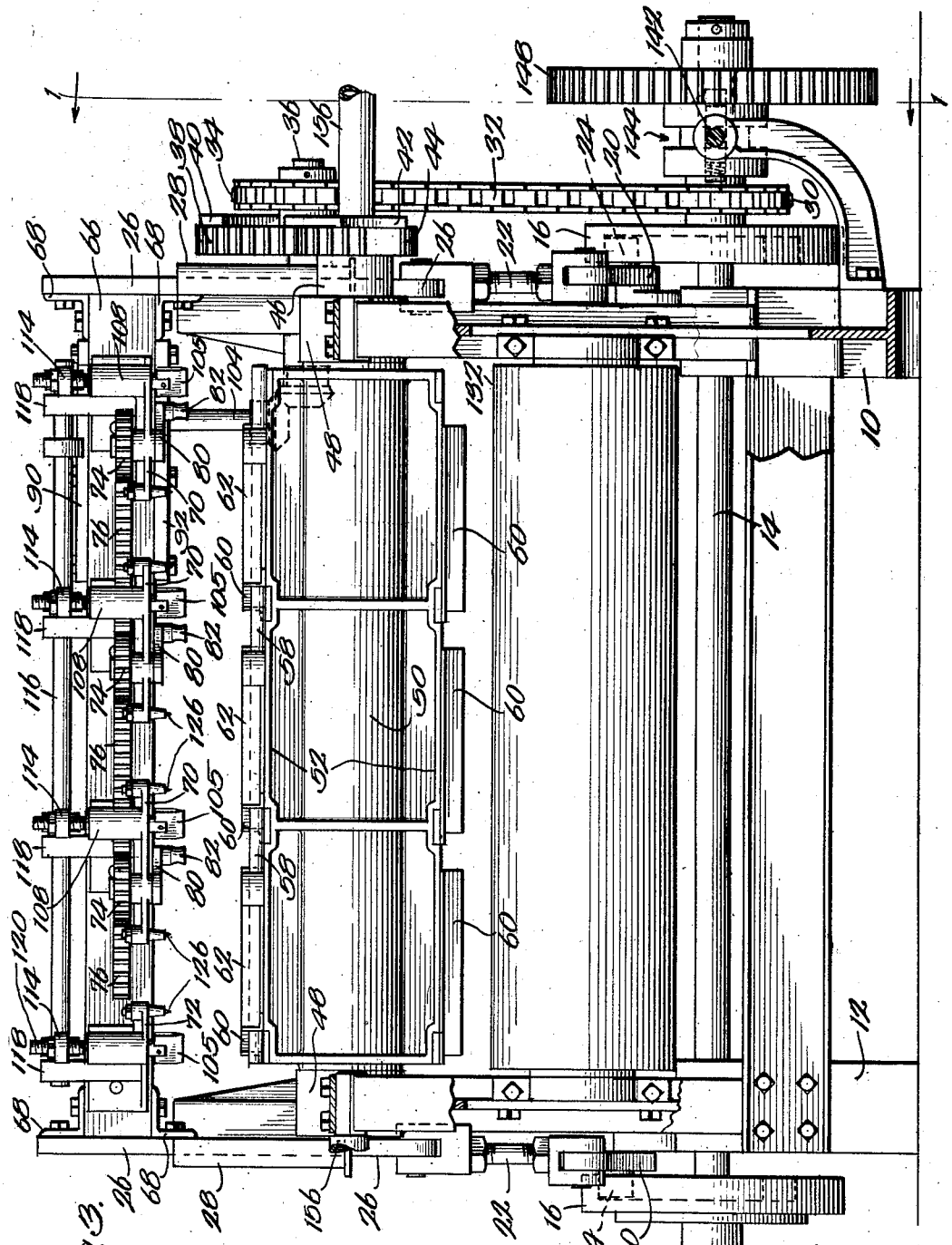

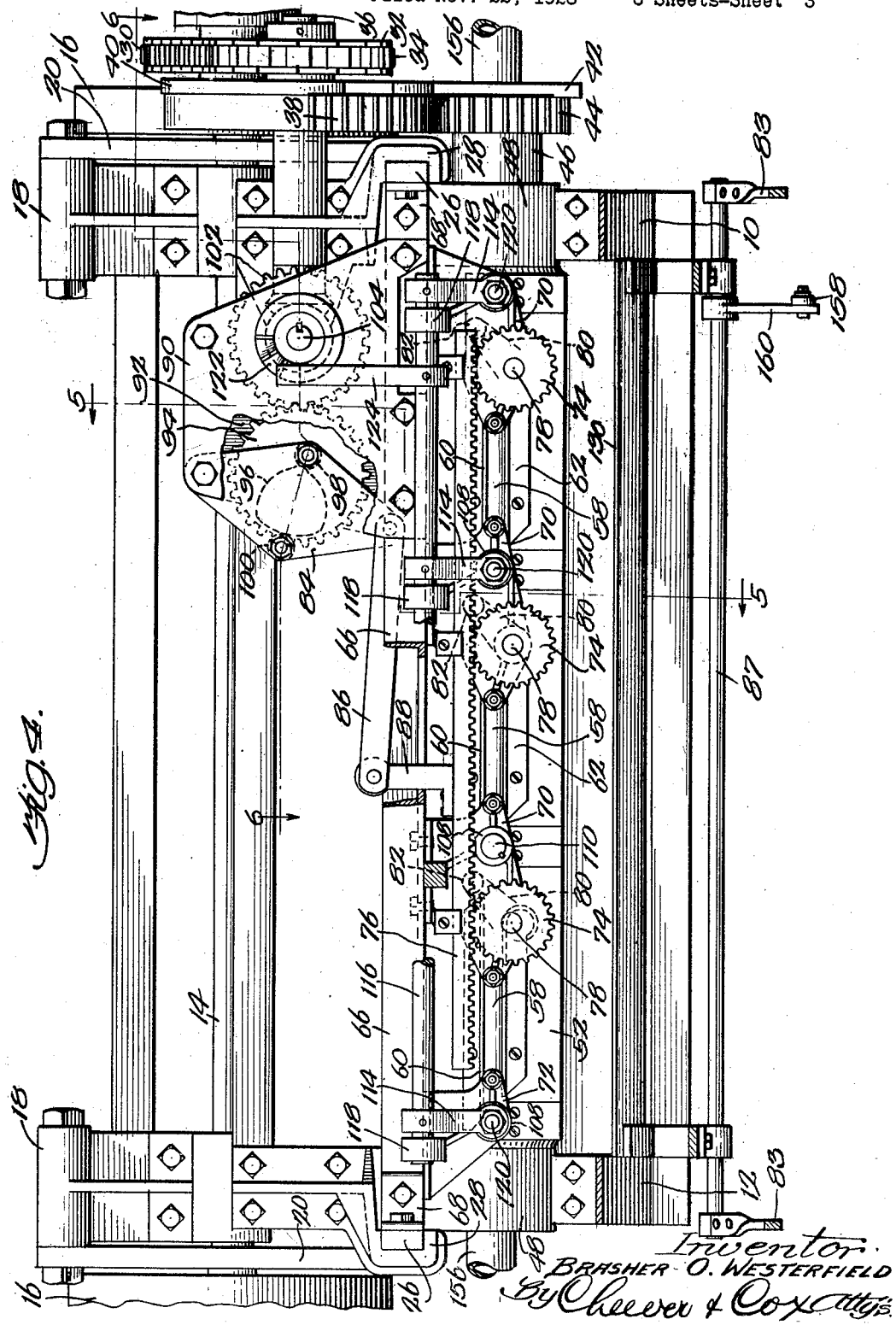

Dec. 15, 1931.  B. O. WESTERFIELD  1,836,349
CANDY FORMING MACHINE
Filed Nov. 22, 1928    6 Sheets-Sheet 4

Inventor:
BRASHER O. WESTERFIELD
By Cheever & Cox
Attys.

Dec. 15, 1931.    B. O. WESTERFIELD    1,836,349
CANDY FORMING MACHINE
Filed Nov. 22, 1928    6 Sheets-Sheet 5

Inventor:
BRASHER O. WESTERFIELD
by Cheever & Cox Attys.

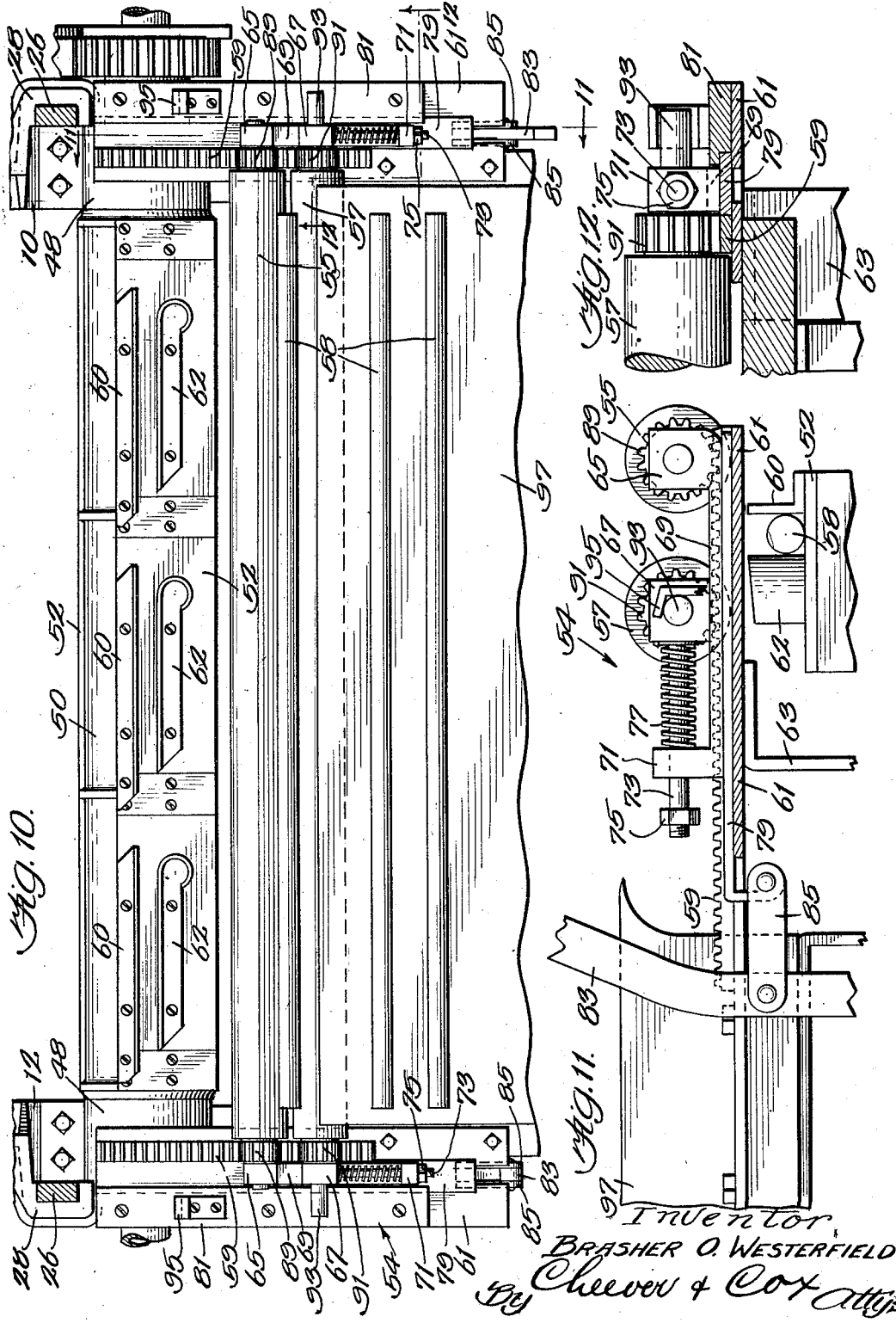

Patented Dec. 15, 1931

1,836,349

UNITED STATES PATENT OFFICE

BRASHER O. WESTERFIELD, OF CHICAGO, ILLINOIS, ASSIGNOR TO BUNTE BROTHERS, OF CHICAGO, ILLINOIS, A CORPORATION OF ILLINOIS

CANDY FORMING MACHINE

Application filed November 22, 1928. Serial No. 321,049.

My invention relates to candy forming machines and, more particularly, to machines for forming candy canes.

In general, one of the primary objects of my invention is to provide a candy forming machine of simple, durable and compact construction which will greatly accelerate the production of candy canes from candy strips.

Another object of my invention is to provide an efficiently operable machine whereby a strip of plastic candy material which is fed thereto will be automatically severed and formed into a plurality of candy canes which are uniform in size and shape and free from surface disfigurements.

A still further object of my invention is to provide a conveniently operable machine for effectively and automatically forming candy canes from a strip of candy stock, which is adapted to sever a strip of stock into a plurality of sections, grip the severed pieces, bend the extremities thereof into uniformly shaped crooks, and then deliver the formed canes to an endless conveyor mechanism.

A still further object of my invention is to provide an efficiently operable candy forming machine which may be operated with a minimum amount of skill and effort, and to this end I propose to supply a machine in which it is only necessary for the operator to feed a strip of candy material thereto and then actuate a conveniently positioned control or lever mechanism in order to cause the machine to complete one cycle of operation, during which the material fed thereto will be formed into a plurality of candy canes and delivered to a conveyor mechanism.

Still another object of my invention is to provide, in a candy forming machine of the type set forth, a feeding mechanism which is adapted to convey an elongated strip of candy cane stock into a position to be acted upon by a cutting and forming mechanism, and to this end I propose to employ a pair of adjacently positioned parallel rollers, the bight of which serves to retain an elongated strip of candy stock, the rotation of said rollers serving to maintain the proper shape of the stock, said rollers being movable in a horizontal plane and separable to permit a candy strip supported thereby to be properly positioned with respect to a cutting and forming mechanism.

These and other objects will be more apparent from the following detailed description when considered in connection with the accompanying drawings wherein,—

Figure 1 is an end view of a candy forming machine which is representative of one embodiment of my invention, said view being taken substantially along the line 1—1 of Figure 3;

Figure 2 discloses a candy cane of the type capable of being formed by the machine shown in Figure 1;

Figure 3 is a front view of the machine as viewed along the line 3—3 of Figure 1;

Figure 4 is a plan view of the machine with certain portions thereof, such as the strip feeding mechanism, broken away to disclose operating mechanisms otherwise hidden;

Figure 10 is a horizontal sectional view taken substantially along the line 10—10 of Figure 1, disclosing in plan the strip feeding mechanism;

Figure 11 is a vertical sectional view taken transversely of the strip feeding mechanism substantially along the line 11—11 of Figure 10; and Figure 12 is a fragmentary vertical sectional view taken along the line 12—12 of Figure 10.

Figure 5:
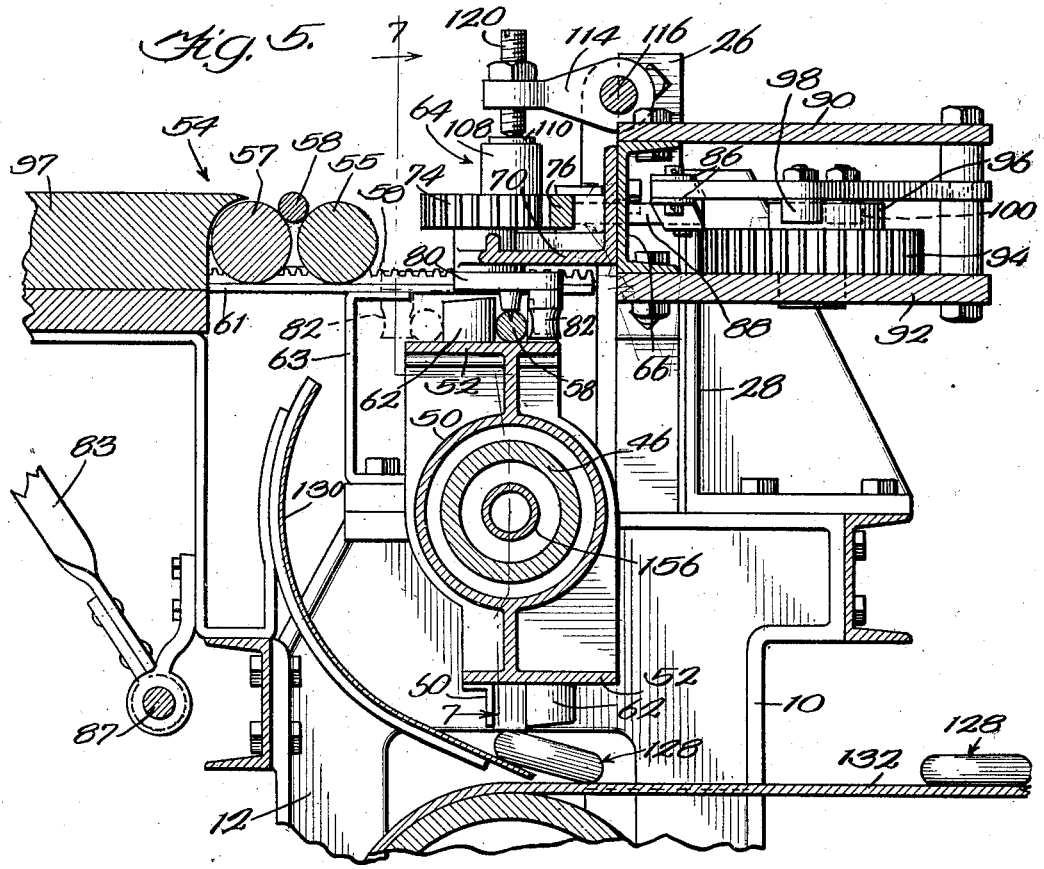
Figure 5 is a fragmentary transverse sectional view of the machine as viewed along the line 5—5 of Figure 4.

Referring now in detail to the drawings wherein I have employed like numerals to disclose similar parts throughout the various figures, it will be observed that one embodiment of my invention comprises a candy forming machine which includes a pair of spaced end frames 10 and 12, the lower rear portions of which support a main drive shaft 14, Figure 1. Secured to this drive shaft 14 adjacent each of the end frames 10 and 12 are grooved cams 16. Inclined upwardly and rearwardly from the frames 10 and 12 are brackets 18, the upper extremities of which pivotally support one end of a lever arm 20. The opposite extremities of these lever arms 20 are pivotally secured to the lower end of an extensible link 22 and the medial portion of each lever arm carries a roller 24, Figure 1, which is adapted to follow in the groove of the cam 16. The extensible links 22 are pivotally connected at their upper extremities with slides 26 which are vertically movable within guide brackets 28. These guide brackets 28 are supported in any suitable manner upon the upper portion of the end frames 10 and 12. From the foregoing it will be clear that for each complete rotation of the cam 16, the slides will experience one complete reciprocation.

Figure 6:
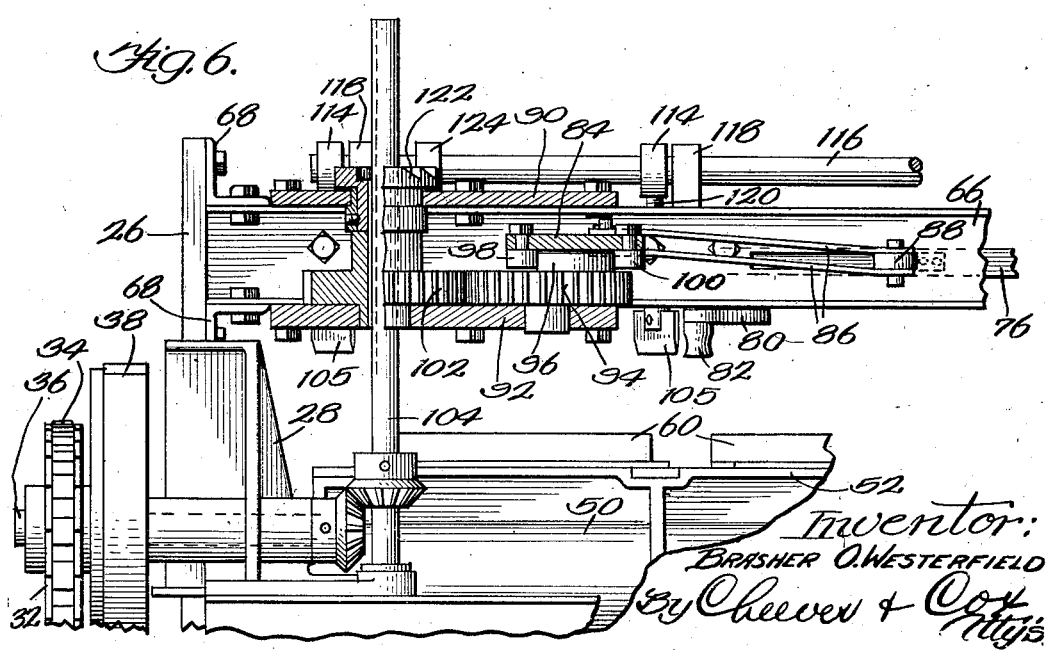
Figure 6 is a fragmentary vertical sectional view of one end of the machine taken along the line 6—6 of Figure 4 to more clearly disclose the rack operating mechanism.
Figure 7:
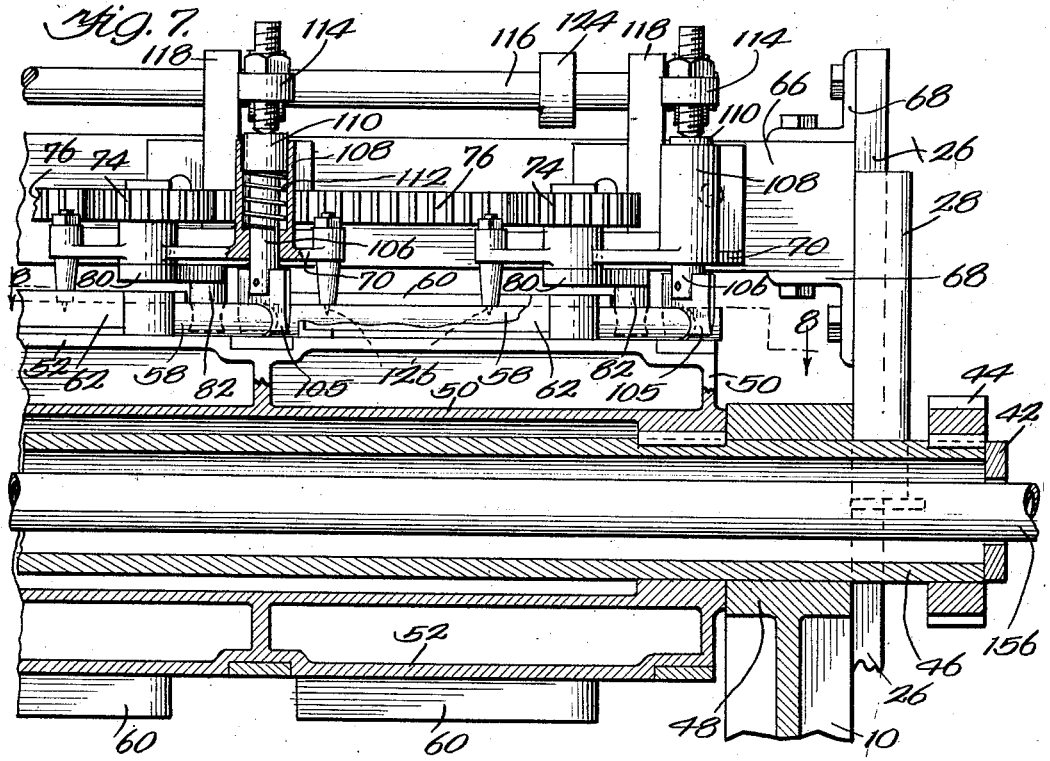
Figure 7 is a fragmentary vertical sectional view taken along the line 7—7 of Figure 5.

Mounted upon the shaft 14, adjacent the cam 16, to the right, Figure 3, is a sprocket gear 30 which is connected, through the agency of a sprocket chain 32, with a similar sprocket gear 34, Figure 1, which is mounted upon a shaft 36. This shaft 36 is rotatable within a rearwardly extending flange portion of the bracket 28, Figure 6, and carries an indexing or mutilated gear 38. Secured to this indexing gear 38 is an index gear locking cam 40. This locking cam 40 co-operates with a cam 42 and the gear 38 co-operates with a gear 44 so as to impart one-half of a complete revolution to the gear 44 for each complete revolution of the shafts 14 and 36. The cam 42 and the gear 44 are carried by a hollow shaft 46, Figure 7 which is journaled between bearings 48 provided at the upper forward portion of the end frames 10 and 12. The hollow shaft 46 also supports a candy receiving rotary mechanism 50. This candy receiving mechanism is formed with oppositely disposed candy receiving tables 52, Figure 5, which are adapted to successively assume a horizontal position adjacent a candy strip feeding mechanism designated generally by the numeral 54, Figures 1, 5 and 10, about to be described.

This strip feeding mechanism 54 includes a pair of receiver rollers 55 and 57 which are arranged in parallelism and spaced slightly apart. The bight provided between these rollers provides a groove for receiving a strip of candy cane material 58 as clearly shown in Figure 1. At opposite extremities of the rollers 55 and 57 are identical roller operating mechanisms which include a rack 59 which is suitably supported in a fixed position upon a plate 61, Figures 10 and 11. This plate 61 is supported in a fixed position by means of a bracket 63 and also serves as a means for supporting a pair of bearing blocks 65 and 67 which are adapted to rotatably support the rollers 55 and 57 respectively. The bearing block 65 is formed integral with and extends upwardly from one end of a bar 69, Figure 11, the opposite end of which is provided with an upright block 71. Slidable within the block 71 and secured at one extremity to the bearing blocks 67 is a rod 73, the outer end of which is provided with a stop nut 75. Interposed between the block 71 and the block 67 is a coil spring 77 and it will be apparent that if the bearing block 65 is moved forwardly to the right, Figure 11, and the block 67 is held in a fixed position, the block 71 will be moved against the spring 77. The bar 69 is carried by a slide 79 which is slidably guided upon the plate 61 by means of a guide member 81, Figure 12. This slide 79 is adapted to be reciprocated in response to the actuation of a suitable lever 83 which is connected to said slide through the agency of a link 85. The lower extremity of the lever 83 is secured to a rotatable shaft 87, Figure 1, and it will be apparent that when said lever is moved forwardly, that is to the right, Figure 1, the rollers 55 and 57 will be moved forwardly as a unit and rotation will be imparted to said rollers through the medium of pinions 89 and 91 which mesh with the rack 59. When these rollers have been moved forwardly to a predetermined position so as to cause the engagement of a protruding shaft portion 93 with a fixed stop 95. continued forward movement of the lever 83 will cause the separation of the rollers so as to permit the strip of candy material 58, supported thereby, to be delivered to the surface of the tables 52. I provide a table 97 upon which strips of candy stock may be placed in position to be fed into the bight of the rollers 55 and 57. It will also be apparent that in addition to serving as a means for advancing a strip of candy stock, these rollers provide an effective means for working the plastic material supported thereby so as to positively insure the delivery to the tables 52 of a properly formed strip. That is to say, as the candy is being advanced by the rollers, it is also rotated and thus formed into a straight strip having uniform circular cross section throughout its length.

Spaced along the surface of the tables 52 are pairs of forming bars 60 and 62 between which one of the strips of candy material 58 is adapted to be positioned when it is delivered thereto by the feeding mechanism 54. Although I have shown the rotary candy receiving mechanism 50 as having only three pairs of candy forming bars 60 and 62, spaced along each of the tables 52, it will be readily apparent that my invention contemplates the use of longer candy receiving tables in instances where greater output is required. After the strip of candy material 58 has been positioned between the forming bars 60 and 62, in the manner described, a movement of the cam 16 in the direction indicated by the arrow will cause a forming mechanism, which I have indicated generally by the numeral 64, to be lowered.

Figure 9:
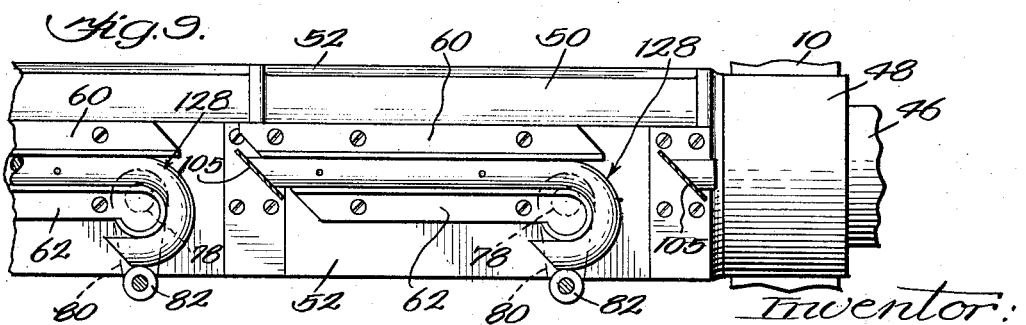
Figure 9 is a view similar to Figure 8 disclosing the manner in which the forming lever bends the extremities of the severed sections of candy stock to form a crook.

This candy forming mechanism comprises a horizontal supporting beam 66 which is connected at its opposite ends by means of suitable brackets 68 to the upper portion of the slides 26, as clearly shown in Figure 3. Secured to the beam 66 at spaced intervals, and extending forwardly therefrom, is a plurality of brackets 70 and a bracket 72. The brackets 70 support pinions 74 which mesh with a rack bar 76. The lower extremity of pins 78 which carry the pinions 74, support forming levers or arms 80, the free extremities of which are provided with forming rollers 82. Reciprocation is imparted to the rack bar 76 through the agency of a rocker arm 84, Figure 4, the free extremity of which is connected to a link 86 which in turn pivotally connects with an arm 88 secured to the back of the rack bar. The rocker arm 84 is pivotally supported between a pair of rearwardly extending frame members 90 and 92, Figures 4 and 5, which are secured to the support beam 66. The mechanism for actuating the rocker arm 84 in proper timed relation with respect to the other movable parts of the machine, comprises a gear 94 mounted upon the frame member 92 which carries a cam 96. This cam 96 is eccentrically positioned on the gear 94 and operates between a pair of spaced rollers 98 and 100 carried by the rocker arm 84. Rotation is imparted to the gear 94 by a gear 102 which is slidably keyed to a vertical shaft 104, Figure 6, the lower extremity of which has a beveled gear connection with the shaft 36. It will thus be apparent that during a predetermined portion of each revolution of the shaft 36, the rack bar 76 will experience a complete reciprocation through the agency of the mechanisms just described. The movement of the rack bar to the right, Figure 4, will cause the lever arms 80 which carry the forming rollers 82, to rotate with their companion pinions 74, and this movement will take place when the forming mechanism 64 reaches its lowermost position. In addition to the forming rollers 82, the brackets 70, as well as the bracket 72, carry cutters 105. These cutters are secured to the lower extremity of a pin 106, Figure 7, which is resiliently mounted within a sleeve 108 formed on each of the brackets 70 and 72. The upper end of the pin 106 is provided with an enlarged head 110 and interposed between this head and the bottom of the sleeve 108 is a coil spring 112. Thus the cutters are resiliently supported within the sleeves 108 and as the forming mechanism 64 is lowered, these cutters are moved into association with the plastic strip of candy 58 now positioned between the forming bars 60 and 62. In order to insure the severance of the strips by the cutters 105, I employ a plurality of levers 114 which are secured at one extremity to a shaft 116 supported by brackets 118 spaced along the beam 66. The forward extremities of these levers 114 are provided with adjustable screws 120, the lower ends of which are adapted to strike the heads 110 of the pins 106. A hammering action is imparted to these screws 120 through the agency of a ratchet 122, Figures 1, 4 and 6, which is slidably keyed to the shaft 104. The teeth on this ratchet 122 engage the free end of an arm 124 extending rearwardly from the shaft 116. Thus a hammering or chattering action is imparted to the cutters 105 so as to completely sever the candy strip. It will also be noted that the brackets 70 and the bracket 72 carry a plurality of depending pins 126 which are sharpened at their lower extremities. These pins 126 serve to hold the severed sections of the candy strip in position between the forming members 60 and 62 during the movement of the forming rollers 82. Movement is imparted to the arm which carries these rollers 82 immediately subsequent to the completion of the severing operation of the cutters 105. Referring to Figure 9, it will be seen that the rollers 82 co-operate with the forming member 62 to simultaneously form one end of the severed sections of the candy strip 58 with a crook. These severed sections now assume the shape of canes, which I have indicated generally by the numeral 128. By employing a candy forming mechanism of the type just described, I am able to sever and bend plastic candy strips so as to contemporaneously form a plurality of candy canes of uniform size and shape. During the functioning of this mechanism, no portion of the candy strip is subjected to elongation or stresses which might tend to deform or disfigure the plastic mass, and by employing the pins 126, the severed sections are held sufficiently rigid to cause each one to be uniformly shaped. The impression made by the pins 126 is very slight and when the canes are finally hardened, these impressions are not noticeable.

Subsequent to the severing and forming operations just described, the continued rotation of the cams 16 cause the forming mechanism 64 to be raised and at this period of the cycle of operation the mutilated gear 38 meshes with the gear 44 so as to impart rotation to the candy strip receiving mechanism 50 in the direction indicated by the arrow, Figure 1. The candy canes are carried into association with an apron 130 which is arcuately formed so as to effect the gentle delivery of each cane to a continuously moving endless belt 132, Figures 1 and 5.

The controlling mechanism for the machine just described constitutes a lever 134, Figure 1, which may be actuated in any convenient manner such as by the foot of the operator, and this lever is mounted upon a shaft 136 which carries an arm 138, the upper extremity of which is secured to one end of a link 140. This link 140 is pivotally secured at its opposite extremity to a clutch pin 142 which forms a part of a conventional clutch mechanism indicated generally by the numeral 144, Figure 3. The retraction of the clutch pin 142 against the action of a coil spring 146, Figure 1, operates to establish mechanical connection between the main drive shaft 14 and a driving gear 148, Figure 1, which is connected with any suitable source of power supply (not shown). The clutch mechanism 144 is of conventional punch press type which is adapted to permit the machine to make one complete cycle of operation and hence a detailed description thereof is not necessary for a clear understanding of the invention. From the foregoing it will be apparent that for each single depression or lowering of the lever 134, the machine will experience one complete cycle of operation and will be brought to rest in the position shown in Figure 1.

In order to positively prevent the operator from causing the lowering of the forming mechanism when the rollers 55 and 57 are positioned therebeneath, I provide a link 158 which is interposed between a pair of lever arms 160 and 162. The lever arm 160 is secured to the shaft 87 and operatively engages the upper end of the link 58 in a slot 164. The lever arm 162 is secured to the shaft 136 and obviously when the lever or foot pedal 134 is moved downwardly, the link 158 will also be urged downwardly. In the event that the feeding mechanism 54 occupies the advanced position beneath the forming mechanism 64, the downward movement of the link 58 will cause the immediate retraction of the feeding mechanism through the medium of the lever arm 160, the shaft 87 and the operating lever 83.

Figure 8:
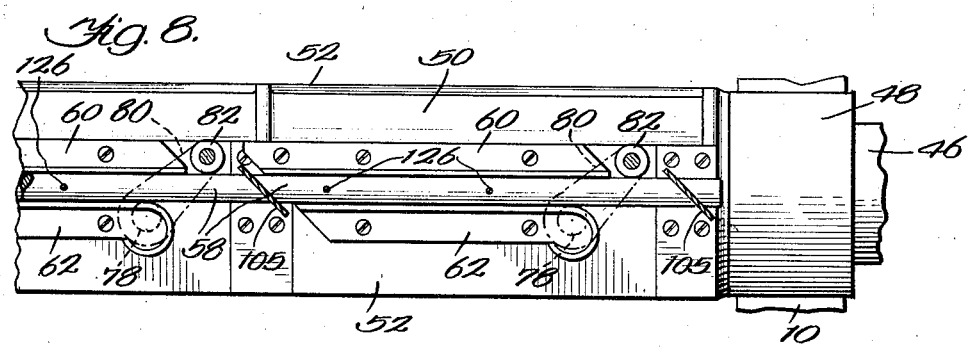
Figure 8 is a horizontal sectional view taken along the line 8—8 of Figure 7 disclosing in plan certain of the candy forming bars and a strip of candy stock associated therewith at the time said stock is being severed.

In the operation of my improved machine a plastic candy strip is moved from the table 97 into position between the rollers 55 and 57 as clearly shown in Figure 1. The operator then moves the lever 83 forwardly and when the shaft portion 93 of the roller 57 engages the stop 95, the roller 55 will be separated from the roller 57 sufficiently to permit the candy strip to be freely deposited by gravity upon the plate 52. The lever 83 is then moved rearwardly and the operator depresses the lever 134. This operatively connects the main driving gear 148 with the drive shaft 14. The rotation of the grooved cams 16 will cause the forming mechanism 64 to be lowered and the cutters 105 to sever the candy strip into a plurality of sections as shown in Figure 8, a hammering action being imparted to the cutters to insure the severance of the strip. The forming rollers 82 are then actuated to form uniform crooks at one extremity of each of the severed sections and during this operation the pins 126 hold the candy stock in position. The cams 16 then operate to raise the forming mechanism 64 and simultaneously therewith, the mutilated gear 38 meshes with the gear 44 so as to impart a half of a revolution to the candy receiving mechanism 50. The arcuate apron or slide 130 receives the candy canes and gently delivers the same to the endless conveyor belt. In order to maintain the tables 52 at a proper temperature for handling plastic candy material, a pipe 156 extends through the hollow bearing 46 and this pipe may be supplied with any suitable heating medium such as steam or hot water. As already described, means is also provided for positively preventing the inadvertent positioning of the feeding rollers beneath the forming mechanism 64.

From the foregoing it will be apparent that my invention provides a machine which is designed to automatically form candy canes from a strip of plastic candy stock with a minimum amount of effort and skill on the part of an operator. It will also be observed that the candy canes are uniformly shaped and cut without the slightest possibility of any of the surface portions thereof becoming disfigured. This feature is very important in connection with the manufacture of candy canes, because articles such as candy canes become practically unsalable if any portion thereof becomes marred or disfigured. The cutting and bending of stock such as strips of plastic candy material ordinarily employed in the manufacture of candy canes, differs materially from the cutting, bending and otherwise forming of materials such as metals, wood, and the like. This fact will be apparent when it is understood that the application of a slight force longitudinally of the plastic mass, used for making canes, will cause the same to be elongated and sufficiently disfigured to render the same unsalable. In this connection it must also be understood that other materials such as metal and wood may be heated and bent into various shapes by the application of considerable force without any tendency of producing flattened surfaces thereon. However, in handling strips of candy material, said material must be continually rolled upon a flat plate in order to prevent the same from flattening during the forming thereof. My improved machine precludes the possibility of forming flat surfaces upon the strip material, because no forces are exerted which would have the slightest tendency to set up stresses within the material which might produce such deleterious results. The rotation of the rollers 55 and 57 operates to effectively work a strip of candy carried thereby so as to cause the straightening of said strip and to form the same into a body of uniform circular cross section. Thus, candy strips delivered to the roller receiving table will be uniformly shaped throughout the entire length thereof.

Having thus described my invention, what I claim as new and desire to secure by Letters Patent is:

1. In a machine for forming candy canes and the like from a plastic candy strip, a strip receiving means, means to introduce a candy plastic strip laterally into the receiving means, means for forming a crook adjacent one end of a plastic strip on said receiving means, the remaining portion of the strip being maintained in elongated form to provide the staff portion of a cane, driving means, and means connecting the forming means with said driving means.

2. In a machine for forming candy canes and the like from a plastic strip, a strip receiving means, means for laterally directing a candy strip toward said receiving means, means for forming a crook adjacent one end of said strip, the remaining portion of said strip being maintained in elongated form to provide the staff portion of the cane, and means for effecting the displacement of the candy strip from the receiving means subsequent to the forming thereof.

3. In a machine for forming a plurality of candy canes and the like from a plastic strip, a strip receiving means, means for severing a strip in said receiving means into a plurality of sections, means for forming a crook adjacent one end of each of the severed sections, the remaining portions of said sections being maintained in elongated form to provide the staff portion of a cane, driving means, and means connecting the severing and crook forming means with said driving means.

4. In a machine for forming candy canes and the like from plastic candy strips, a strip receiving means, means for simultaneously dividing said strip into a plurality of parts, means for forming a crook adjacent one end of each of said parts, driving means, and means connecting the dividing and crook forming means with the driving means.

5. In a machine for forming candy canes and the like from a plastic candy strip, a strip receiving means, means for dividing the candy strip into a plurality of sections, means for simultaneously forming a crook at one end of each of said sections, a rotary driving means, and means connecting the dividing and crook forming means with the rotary driving means.

6. In a machine for forming candy canes and the like from a plastic candy strip, a strip receiving means, a plurality of forming members associated therewith, means for dividing the candy strip into a plurality of sections adjacent each forming member, means for forcing an end portion of each of said sections around the forming member associated therewith to form a crook, a rotary driving means, and means connecting the dividing and forcing means with the rotary driving means.

7. In a machine for forming candy canes and the like from a plastic candy strip, a strip receiving means, a plurality of forming members adjacent said strip receiving means, means for forcing spaced portions of a candy strip around said members to form crooks, the remaining portion of said strips being maintained in elongated form to provide staffs, means for effecting the displacement of the candy canes from the strip receiving means, and an endless conveyor positioned adjacent said displacing means.

8. In a candy forming machine, means for receiving a strip of candy, means to divide a received strip into a plurality of pieces, means for forming a crook adjacent one end of each piece on said receiving means, an endless conveyor mechanism, and means for causing the tilting of the strip receiving means to cause the displacement of the formed pieces and the delivery thereof to the conveyor mechanism.

9. In a machine for automatically forming a plurality of candy canes from a single plastic candy strip, strip severing means, means to support the severed strips in end to end relationship, means for forming a crook adjacent one end of said severed strip sections, the remaining portion of said strips being maintained to provide the staff portions of the cane, and means for causing the displacement of the candy canes at a proper predetermined interval with respect to the actuation of the crook forming means.

10. In a machine for forming a plurality of candy canes and the like from a single plastic candy strip, means for severing sections from said strip, means to support the several strips in end to end relationship, means for forming a crook adjacent one end of the severed sections, the remaining portion of said sections being maintained in elongated form to provide the staff portion of a cane, and means for causing the actuation of the severing and crook forming means at proper predetermined intervals during each complete cycle of operation of the machine.

11. In a machine for forming a plurality of candy canes and the like from a single plastic candy strip, means for severing a plurality of sections from said strip, means to support the severed strips in end to end relationship, means for forming a crook adjacent one end of the severed sections, the remaining portion of said sections being maintained in elongated form to provide the staff portion of a cane, means for causing the actuation of the severing and crook forming means during each cycle of operation of the machine, and conveniently positioned control mechanism for governing the operation of the actuating means.

12. In a machine for forming candy canes and the like from a plastic strip, a strip receiving means, means for severing a section from said strip, means for holding the severed section in position upon the receiving means, and means for forming a crook adjacent one end of the severed section while said section is being held in position.

13. In a candy forming machine, a rotary means having oppositely disposed surfaces for receiving a plurality of candy strips in aligned relationship, candy forming mechanism operatively associated with said rotary receiving means, said mechanism adapted to form the several candy strips upon the uppermost surface of the strip receiving means, and means for effecting a rotary movement to the receiving means subsequent to the operative association therewith of the candy forming mechanism.

14. In a candy forming machine, a rotary means having oppositely disposed surfaces for receiving a plurality of candy strips, a candy forming mechanism operatively associated with said rotary receiving means to simultaneously form each candy strip upon the uppermost surface of the strip receiving means, an endless conveyor mechanism, and means for causing the rotation of the candy receiving means subsequent to the operation of the candy forming mechanism to cause the displacement therefrom of the formed candy strips and the delivery thereof to the endless conveyor mechanism.

15. In a machine for forming candy canes and the like from a plastic candy strip, a strip receiving means, means for forming a crook adjacent one end of a plastic strip on said receiving means, the remaining portion of the strip being maintained in elongated form to provide the staff portion of a cane, means for actuating the crook forming means, and means for maintaining the strip receiving means at a proper temperature whereby a candy strip supported thereby will be maintained at a proper temperature to facilitate the forming thereof.

16. In a machine for forming candy canes and the like from a plastic candy strip, a strip receiving means, means for laterally delivering a strip to said receiving means, means for forming a crook adjacent one end of a plastic strip on said receiving means, the remaining portion of the strip being maintained in elongated form to provide a staff portion of a cane, driving means, and means for connecting the forming means with said driving means.

17. In a machine for forming candy canes and the like from a plastic candy strip, a frame, a strip receiving means carried by said frame, rotary means mounted in said frame for feeding and working a candy strip, means mounted in said frame for forming a crook adjacent one end of a plastic strip on said receiving means, driving means, and means connecting the forming means and said rotary candy feeding and working means with said driving means.

18. In a machine for forming candy canes and the like from a plastic candy strip, a frame, a strip receiving means carried by said frame, feeding means arranged in said frame for delivering a candy strip to the receiving means, said feeding means including reciprocable rotary means which is adapted to work the plastic strip so as to insure the delivery thereof to the receiving means in proper elongated form, forming means carried by said frame, and means for actuating the feeding and forming means.

19. In a machine for forming candy from a plastic candy strip, a strip receiving means, and a feeding means including a pair of adjacently positioned rotary members adapted to receive a candy strip therebetween, said rotary members being reciprocable to effect the advancement and delivery of a strip supported thereby to the strip receiving means, the rotation of said rotary members serving to work the candy strip supported thereby so as to insure the delivery of said strip to the receiving means in proper elongated form.

20. In a machine for forming candy from a plastic candy strip, a strip receiving means, and means for feeding plastic candy strips thereto, said means including a pair of adjacently positioned rollers adapted to support a candy strip in the bight thereof, said rollers being laterally movable to effect the advancement of a strip carried thereby and rotatable to effectively work a supported strip so as to insure the delivery thereof to the receiving means in proper form.

21. In a machine for forming candy canes and the like from a plastic candy strip, a strip receiving means, means for forming a crook adjacent one end of a plastic strip on said receiving means, the remaining portion of the strip being maintained in elongated form to provide the staff portion of a cane, and means for engaging the staff portion of the cane to prevent longitudinal movement thereof during the actuation of the forming means.

22. In a machine for forming candy canes and the like from a plastic candy strip, a strip receiving means, means for forming a crook adjacent one end of a plastic strip on said receiving means, the remaining portion of the strip being maintained in elongated form to provide the staff portion of a cane, and means adapted to extend into the staff portion of the candy strip to prevent longitudinal movement thereof during the forming of said crook.

23. In a machine for forming candy canes and the like from a plastic candy strip, a strip receiving means, means for forming a crook adjacent one end of a plastic strip on said receiving means, said crook forming means being bodily shiftable to dissassociate same from the candy strip after the strip forming operation, actuating means to drive and shift said crook forming means the remaining portion of the strip being maintained in elongated form to provide the staff portion of a cane, and means for delivering a candy strip beneath said forming means in timed relationship with respect to the shifting and operation of the crook forming means as a part of the operating cycle of the machine.

24. In a machine for forming candy canes and the like from a plastic candy strip, a strip receiving means, means for forming a crook adjacent one end of a plastic strip on said receiving means, said crook forming means being vertically shiftable to disassociate same from the candy strip after the crook forming operation the remaining portion of the strip being maintained in elongated form to provide the staff portion of a cane, means for delivering a candy strip beneath said forming means, means to actuate and shift said crook forming means and means for shifting said crook forming means vertically in proper timed relation with respect to the operation of the crook forming means as a part of the operating cycle of the machine.

25. In a machine for forming a plurality of candy canes and the like from a single plastic candy strip, a strip receiving means, a plurality of severing means disposed adjacent said receiving means, a plurality of forming means adapted to form a crook adjacent one end of severed strip portions, driving mechanism, means connected with said driving mechanism for simultaneously actuating said forming means, and means connected with said driving means for shifting said forming means toward and away from said strip receiving means.

26. In a candy forming machine, means for receiving a strip of candy, means for forming a crook adjacent one end of a strip on said receiving means, means for tilting the strip receiving means to effect the displacement of the candy strip therefrom, and means for preventing the dislodgment of the candy cane during the movement of said tilting means.

In witness whereof, I have hereunto subscribed my name.

BRASHER O. WESTERFIELD.